US012580961B2

(12) United States Patent
Meharunnisa et al.

(10) Patent No.: US 12,580,961 B2
(45) Date of Patent: Mar. 17, 2026

(54) TRAINING TRUSTED USERS OF AN ENTERPRISE NETWORK FOR PHISHING ATTACKS ON A PER-USER BASIS

(71) Applicant: Fortinet, Inc., Sunnyvale, CA (US)

(72) Inventors: Farshiya Meharunnisa, Bangalore (IN); Sudheer Nagurla, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 181 days.

(21) Appl. No.: 18/621,079

(22) Filed: Mar. 28, 2024

(65) Prior Publication Data

US 2025/0310374 A1 Oct. 2, 2025

(51) Int. Cl.
*H04L 9/40* (2022.01)
(52) U.S. Cl.
CPC ............................... *H04L 63/1483* (2013.01)
(58) Field of Classification Search
CPC .................................................... H04L 63/1483
See application file for complete search history.

(56) References Cited

U.S. PATENT DOCUMENTS

| | | | | |
|---|---|---|---|---|
| 9,742,803 | B1 * | 8/2017 | Kras | G06F 21/56 |
| 9,800,613 | B1 * | 10/2017 | Irimie | H04L 51/42 |
| 10,911,486 | B1 * | 2/2021 | Joshi | H04L 63/1483 |
| 10,917,429 | B1 * | 2/2021 | Patton | H04L 63/1433 |
| 12,041,087 | B1 * | 7/2024 | Morris | H04L 63/1425 |
| 2013/0297375 | A1 * | 11/2013 | Chapman | G06Q 10/107 |
| | | | | 705/7.28 |
| 2015/0205953 | A1 * | 7/2015 | Belani | G06F 21/55 |
| | | | | 726/25 |
| 2017/0026388 | A1 * | 1/2017 | Gatti | H04L 63/1483 |
| 2018/0309764 | A1 * | 10/2018 | Kras | G06F 21/577 |
| 2019/0173918 | A1 * | 6/2019 | Sites | G06N 3/0985 |
| 2019/0245894 | A1 * | 8/2019 | Epple | H04L 63/1483 |
| 2019/0268374 | A1 * | 8/2019 | Irimie | H04L 63/1433 |
| 2019/0319983 | A1 * | 10/2019 | Shi | H04L 63/1408 |
| 2020/0366713 | A1 * | 11/2020 | Rodriguez | H04L 63/1483 |
| 2021/0021612 | A1 * | 1/2021 | Higbee | H04L 63/1416 |
| 2021/0075828 | A1 * | 3/2021 | Kras | H04L 51/42 |
| 2021/0344710 | A1 * | 11/2021 | Kras | G09B 19/00 |
| 2021/0390181 | A1 * | 12/2021 | McClay | G06F 21/566 |
| 2022/0038498 | A1 * | 2/2022 | Kras | H04L 63/1483 |
| 2023/0073905 | A1 * | 3/2023 | Cavallaro | G09B 5/065 |
| 2023/0075964 | A1 * | 3/2023 | Singh | G06N 3/045 |

(Continued)

*Primary Examiner* — Khang Do
(74) *Attorney, Agent, or Firm* — Law Office of Dorian Cartwright; Dorian Cartwright

(57) ABSTRACT

A user behavior training model is generated, using machine learning, from tracking a plurality of trusted users for interactions with respect to a plurality of monitored phishing e-mails. When a unique phishing attack is detected from an incoming email, a new campaign is initiated. A unique phishing attack email that is modified by the user behavior model is generated for each user. In particular, a first test phishing e-mail for a first user is modified based on inter-actions tracked for the first user and a second test phishing e-mail for a second user is modified based on interactions tracked for the second user. Based on responses to the plurality of test phishing emails, a plurality of custom training videos is generated. A first training video is modified based on a response from the first user and a second training video is modified based on a response from the second user.

9 Claims, 5 Drawing Sheets

400

(56) References Cited

U.S. PATENT DOCUMENTS

| | | | |
|---|---|---|---|
| 2023/0081399 A1* | 3/2023 | Murphy | G06Q 10/06395 |
| | | | 705/7.42 |
| 2023/0138763 A1* | 5/2023 | Walters | G06F 18/214 |
| | | | 382/159 |
| 2023/0224328 A1* | 7/2023 | Irimie | H04L 63/1483 |
| | | | 726/22 |
| 2023/0336588 A1* | 10/2023 | Adams | G06F 40/20 |
| 2024/0096234 A1* | 3/2024 | Brennan | G09B 19/0053 |
| 2024/0160782 A1* | 5/2024 | Thomas | G06F 21/6245 |
| 2024/0333750 A1* | 10/2024 | Parla | G06F 21/563 |
| 2024/0333771 A1* | 10/2024 | Patton | H04L 63/1433 |
| 2025/0112953 A1* | 4/2025 | Uniyal | G06T 19/006 |
| 2025/0175488 A1* | 5/2025 | Taylor | H04L 63/1433 |
| 2025/0310374 A1* | 10/2025 | Meharunnisa | H04L 63/1483 |

* cited by examiner

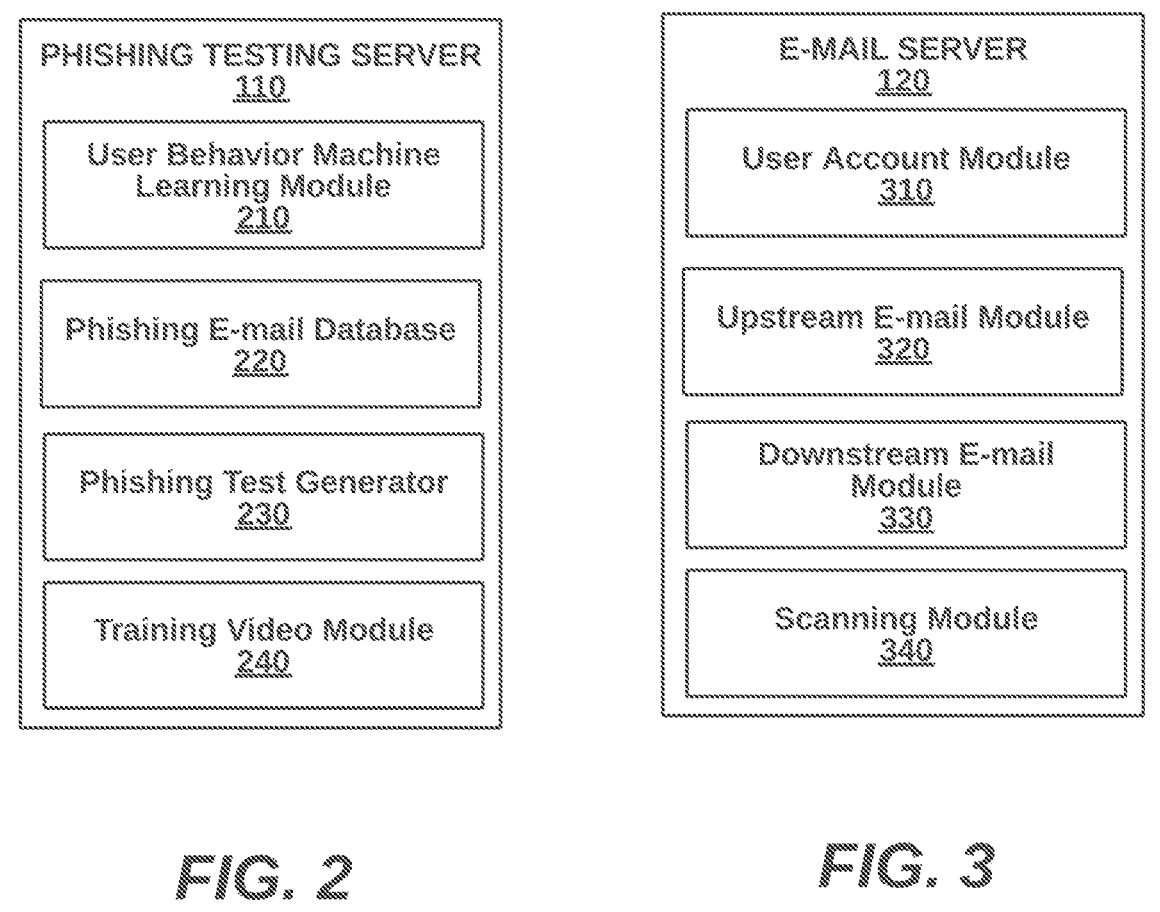

PHISHING TESTING SERVER
110

User Behavior Machine
Learning Module
210

Phishing E-mail Database
220

Phishing Test Generator
230

Training Video Module
240

*FIG. 2*

E-MAIL SERVER
120

User Account Module
310

Upstream E-mail Module
320

Downstream E-mail
Module
330

Scanning Module
340

START

RECEIVE E-MAILS FOR TRUSTED
USERS OF AN ENTERPRISE NETWORK
<u>410</u>

LAUNCH NEW PHISHING E-MAIL
CAMPAIGN OF INDIVIDUALIZED
CONTENT WITH MACHINE LEARNING
<u>420 (SEE DETAIL IN FIG. 5)</u>

GENERATE INDIVIDUALIZED TRAINING
VIDEOS BASED ON RESPONSES TO
NEW PHISHING E-MAIL CAMPAIGN
<u>430</u>

END

_420_

FROM 410

GENERATE USER BEHAVIOR TRAINING
MODULE WITH MACHINE LEARNING BY
MONITORING USER INTERACTIONS
510

POPULATE PHISHING E-MAIL
DATABASE WITH KNOWN PHISHING
E-MAILS
520

GENERATE NEW PHISHING E-MAIL
CAMPAIGN RESPONSIVE TO
DETECTING UNIQUE FISHING ATTACK
530

INDIVIDUALLY MONITOR USER
INTERACTIONS WITH TESTE-MAILS
540

TO 430

TRAINING TRUSTED USERS OF AN ENTERPRISE NETWORK FOR PHISHING ATTACKS ON A PER-USER BASIS

FIELD OF THE INVENTION

The invention relates generally to computer network security, and more specifically, for testing and training trusted users of an enterprise network for phishing attacks on a per-user basis.

BACKGROUND

Phishing is a type of social engineering attack where a hacker utilizes text messaging or other types of email to steal sensitive information. They employ names, logos, and addresses that are easily recognized. Phishing emails target unwary users and attempt to deceive them into exposing personal information. A phishing email poses as a trusted organization, such as a financial institution, an online platform, or a well-known corporation, and requests the user to supply information including login credentials, bank account information, and other personal and financial details. The sender will then utilize this information for unlawful purposes like fraud, identity theft, or hacking.

The attachments or links in phishing emails commonly direct recipients to malicious websites or files. Although they could look legitimate, the links lead to dubious websites that are designed to steal personal information like credit card numbers or login information. Recipients mistakenly give the attacker what they want by replying to the phishing email.

In the event that recipients open an attachment, it may run malicious code that can jeopardize the network security or the device of the recipient, granting attackers unauthorized access or control. As soon as the attackers have access to sensitive data, they can use it for a variety of crimes, including identity theft, financial fraud, unauthorized account access, and selling the data on the dark web.

However, there are many drawbacks to conventional phishing security systems. First, there is a lack of realism without real-world simulations of phishing attacks. Further, a one-size-fits-all approach to training on security awareness ignores individual needs. Moreover, attackers are constantly changing tactics, requiring training courses to be frequently updated to reflect new phishing trends and attack methods.

What is needed is a robust technique for testing and training trusted users of an enterprise network for phishing attacks on a per-user basis.

SUMMARY

To meet the above-described needs, methods, computer program products, and systems for training trusted users of an enterprise network for phishing attacks on a per-user basis.

In one embodiment, a user behavior training model is generated, using machine learning, from tracking a plurality of trusted users for interactions with respect to a plurality of monitored phishing e-mails. The monitored phishing e-mails are not harmful. A phishing e-mail database, for the tests, is populated with incoming e-mails received from an email server that include a phishing attack.

In another embodiment, when a unique phishing attack is detected from an incoming email, a new campaign is initiated. A unique phishing attack email that is modified by the user behavior model is generated for each user. In particular, a first test phishing e-mail for a first user is modified based on interactions tracked for the first user and a second test phishing e-mail for a second user is modified based on interactions tracked for the second user.

In still another embodiment, based on responses to the plurality of test phishing emails, a plurality of custom training videos is generated. A first training video is modified based on a response from the first user and a second training video is modified based on a response from the second user.

Advantageously, computer networks are improved with better performance from reduced malicious activity.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a phishing attack server of the system of FIG. 1, according to an embodiment.

FIG. 3 is a more detailed block diagram illustrating an e-mail server of the system of FIG. 1, according to an embodiment.

DETAILED DESCRIPTION

Methods, computer program products, and systems for training trusted users of an enterprise network for phishing attacks on a per-user basis. The following disclosure is limited only for the purpose of conciseness, as one of ordinary skill in the art will recognize additional embodiments given the ones described herein. For example, phishing e-mails are referred to throughout the disclosure, although other types of phishing messaging is possible, using SMS, social media messaging applications, or the like.

I. Systems for Custom Phishing Attack Training (FIGS. 1-3)

Figure 1:
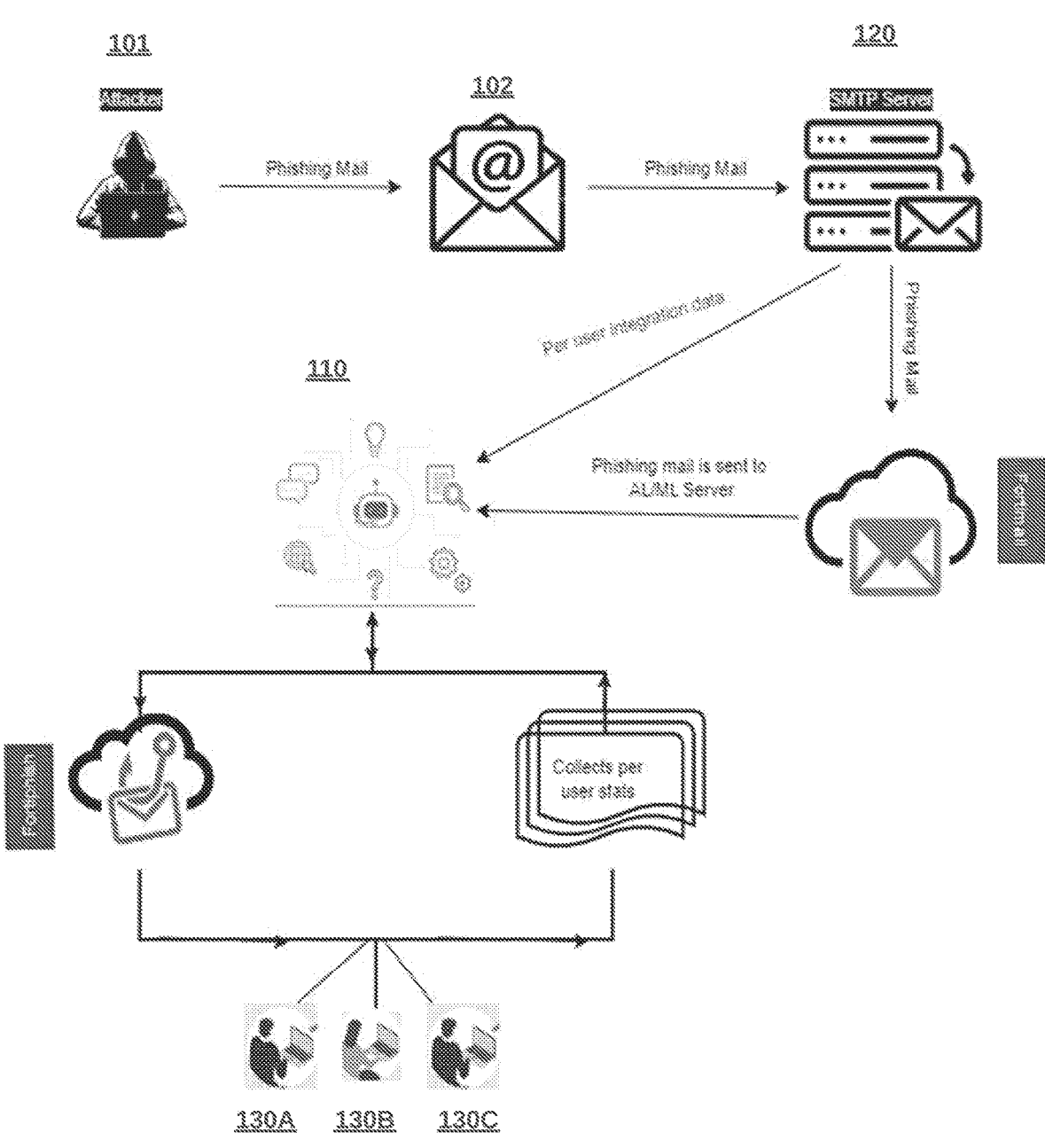
FIG. 1 is a high-level block diagram illustrating aspects of a system coordinating for training trusted users of an enterprise network for phishing attacks on a per-user basis, according to some embodiments.
Figure 6:
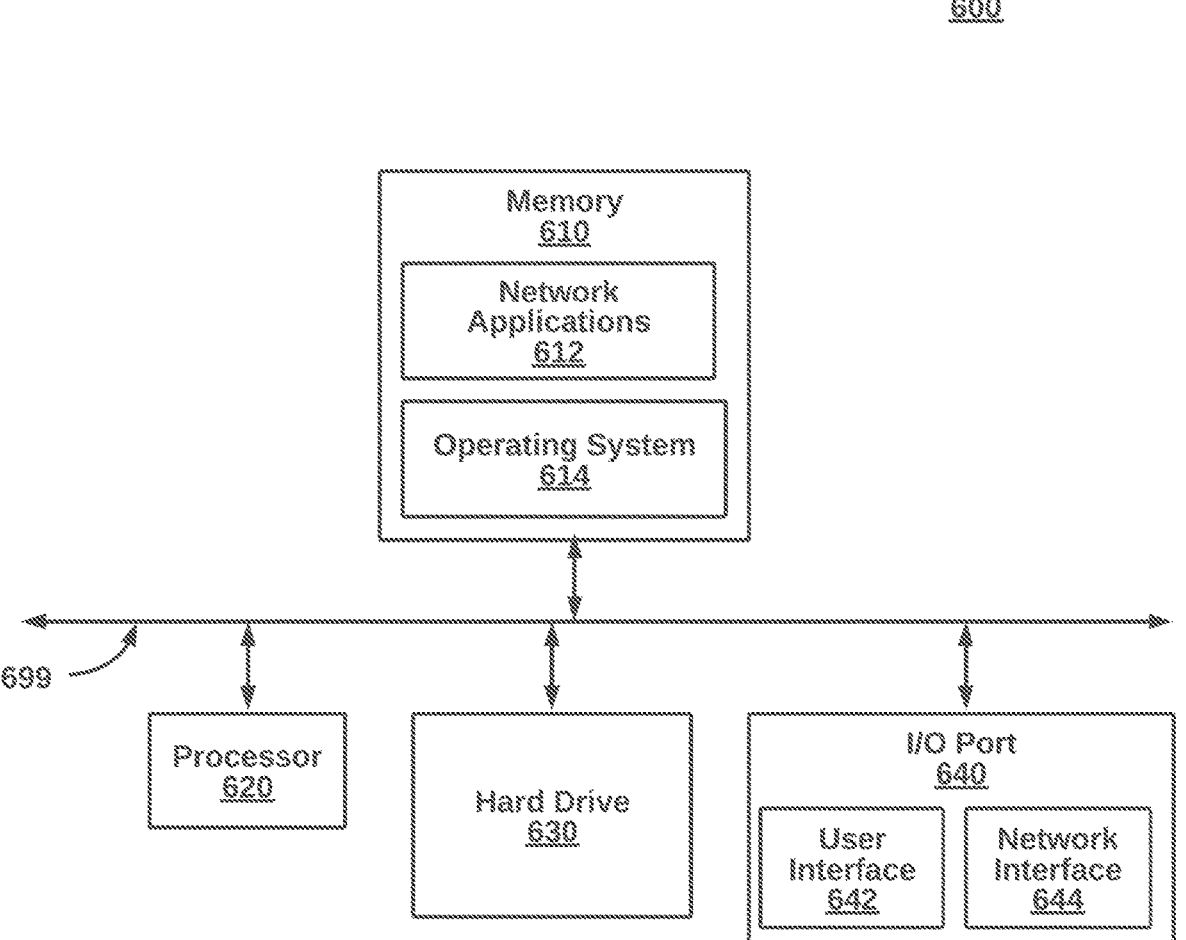
FIG. 6 is a block diagram illustrating an example computing device for the system of FIG. 1, according to an embodiment.

FIG. 1 is a high-level block diagram illustrating a system 100 for training trusted users of an enterprise network for phishing attacks on a per-user basis, according to an embodiment. The system 100 includes a phishing training server 110, an e-mail server 120, and user devices 130A-C, on a data communication network. A malicious user 101 can send a phishing e-mail 102 to a user in the enterprise network. Other embodiments of the system 100 can include additional components that are not shown in FIG. 1, such as routers, switches, network gateways, and firewalls, and access points. Further, there can be more training servers, email servers and stations. The components of system 100 can be implemented in hardware, software, or a combination of both. An example implementation is shown in FIG. 6.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system via hard wire (e.g., phishing training server 110, email server 120, and user devices 130A-C). The components can also be connected via wireless networking (e.g., user devices 130A-C). The data communication network can be composed of any combination of hybrid networks, such as an SD-WAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, 802.11be, Wi-Fi 6, Wi-Fi 6E, Wi-Fi 7 and the like. Components can use IPv4 or Ipv6 address spaces.

In one embodiment, the phishing training server 110 prepares trusted users of an enterprise network for phishing e-mails. A machine learning model is established by monitoring user behavior for known phishing e-mails. A new campaign is initiated when a unique phishing e-mail is identified. The new campaign can customize a set of phishing e-mails to trusted users, based on individualized user behavior. Individual responses to the e-mails are monitored and used to generate a custom training video for each user.

The e-mail server 120 can comprise a Mail Transfer Agent (MTA) server, a Simple Mail Transfer Protocol (SMTP) server, or the like, that stores e-mails for trusted users. The SMTP is a technical standard for transmitting e-mail over a network. This allows computers and servers to exchange data regardless of their underlying hardware or software. A user can log-in to the e-mail server 120 from a user device using, for example, a username and a password. Separate protocols can be used to retrieve email from the e-mail server, such as Internet Message Access Protocol (IMAP) or Post Office Protocol (POP).

In some embodiments, the e-mail server 120 scans incoming e-mails to identify phishing e-mails before being exposed to users. Several Natural Language Processing (NLP) techniques can be used to identify phishing e-mails by training machine language models. Text classification learns to recognize patterns, keywords, and linguistic cues such as poor grammar and spelling errors, that can indicate the presence of phishing content. Keyword analysis looks for high frequency keywords and phrases that are commonly associated with fraudulent activity. Sentimental analysis identifies language that creates a sense of urgency or panic in the recipient, pushing them to take immediate action from emotional manipulation. Similarity analysis compares the content of incoming e-mails to a database of known phishing templates or previous phishing examples. Finally, link and URL analysis identify hyperlinks to known malicious web sites.

The user devices 130A-C can be a personal computer, a laptop, a smartphone, a tablet, a terminal, or any other appropriate processor-driven device for e-mail services. An e-mail client is a user application, such as a web browser, Outlook, or the like can retrieve and display e-mail from the e-mail server 120. Users can compose new e-mails, retrieve stored e-mails, and forward and reply to stored e-mails.

The e-mail itself, in one embodiment, includes an SMTP envelope, a header and a body. The SMTP envelope enables communication between servers that exchange e-mails. The header includes e-mail data about the sender, the receiver(s), the data, and subject. The body includes content for communication to the user. For example, a bank e-mail may include a login screen or login URL. Malicious actors can generate e-mails that impersonate a legitimate bank e-mail in order to compromise a user's login data. Additionally, attachments can be included with the body for downloading potentially malicious files.

FIG. 2 is a more detailed block diagram illustrating the phishing testing device 110 of the system of FIG. 1, according to one embodiment. The phishing e-mail database 110 includes a user behavior machine learning module 210, a traffic phishing e-mail database module 220, a phishing test generator 230 and a training video module 240. The components can be implemented in hardware, software, or a combination of both.

The user behavior machine learning module 210 uses artificial intelligence to generate a user behavior training model, using machine learning, from tracking a plurality of trusted users for interactions with respect to a plurality of monitored phishing e-mails. The monitored phishing e-mails are not harmful. For instance, a non-harmful URL or non-harmful attachment can be substituted for the identified harmful URL or harmful attachment. In some embodiments, besides individual user data, statistics are also collected for groups of users, an enterprise as a whole, specific categories of phishing e-mails, and other analytical data is collected.

Users can have various interactions with actual phishing e-mails and test phishing e-mails that are monitored and used as historical data or training data for building a model. Interactions can be direct, such as clicking a link or providing sensitive information. Interactions can also be indirect, such as ignoring a link or not providing sensitive information. Environmental data is also collected for analysis of user behavior, such as type of computing device being used, software applications used to access e-mail servers, location of a user device, IP address of a user device, and many other parameters.

The phishing e-mail database 220 is populated with incoming e-mails received from an email server that has identified a phishing attack embedded within an e-mail, destined for the enterprise network. In other embodiments, a library of known phishing e-mails are pre-populated. In still other embodiments, besides e-mails, SMS messages, WhatsApp messages, Instagram messages, or other types of messaging can be examined for phishing characteristics.

The phishing test generator 230 can determine whether a phishing attack from an incoming email is unique from existing training data. The phishing test generator generates a test phishing e-mail for users for unique phishing attacks, from a unique phishing attack email that is modified by the user behavior model, wherein a first test phishing e-mail for a first user is modified based on interactions tracked for the first user and a second test phishing e-mail for a second user is modified based on interactions tracked for the second user. In some implementations, phishing campaigns are launched over SMS or other messaging applications.

The training video module 240 can, based on responses to the plurality of test phishing emails, generate a plurality of training videos. A first training video is modified based on a response from the first user and a second training video is modified based on a response from the second user. In one case, a library of clips is available and updated for different phishing situations. User behaviors can be mapped to a group of clips that are stitched together and sent to the user as a file or link to the video. In another case, the same e-mail content used for the test campaign is also used in a computer-generated video. The video content can also include recorded user strokes, harmful interactions, non-harmful interactions, and audio. The video content can be based on a single test e-mail or a combination of test e-mails.

FIG. 3 is a more detailed block diagram illustrating the e-mail server 120 of the system of FIG. 1, according to one embodiment. The e-mail server 110 includes a user account module 310 to authenticate users and provide access to incoming and outgoing messages. An upstream e-mail module 320 connects upstream to a wide area network to receive messages destined for trusted users from external destinations and to transmit outgoing messages. A downstream e-mail module 330 connects downstream to user devices for display and management of e-mails. Received e-mails can be read and e-amils can be composed for transmission. A scanning module 340 examines incoming and outgoing e-mails for security policy violations. Phishing rules can be a subset of security rules. Rules can be configured by end users, network administrators, or automatically by software. The components can be implemented in hardware, software, or a combination of both.

II. Methods for Custom Phishing Attack Training (FIGS. 4-5)

Figure 4:
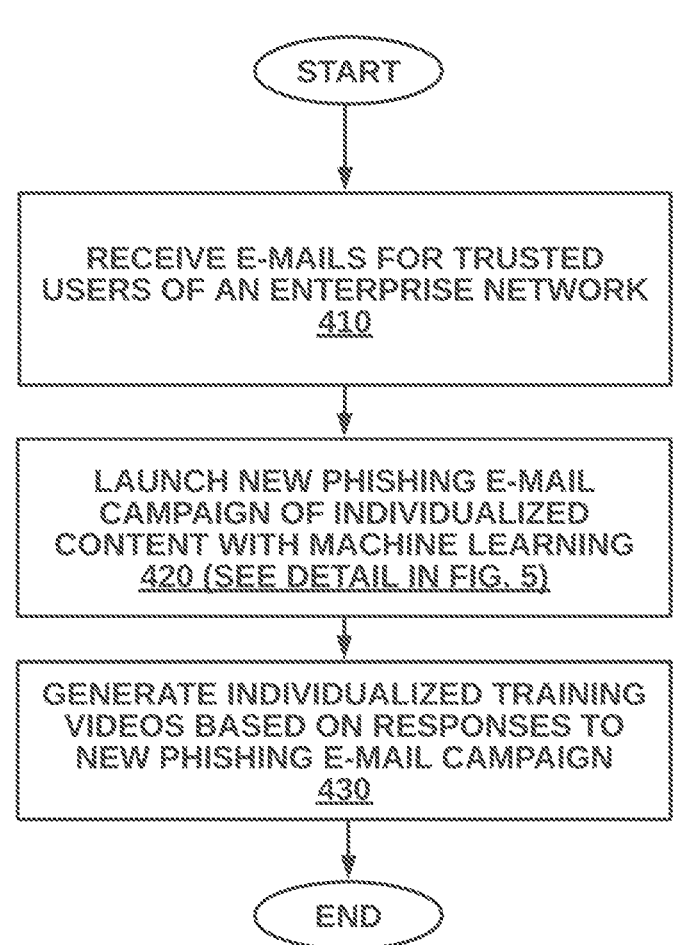
FIG. 4 is a high-level flow diagram illustrating a method for training trusted users of an enterprise network for phishing attacks on a per-user basis, according to an embodiment.

FIG. 4 is a high-level flow diagram of a method 400 for training trusted users of an enterprise network for phishing attacks on a per-user basis, according to an embodiment. The method 400 can be implemented by, for example, system 100 of FIG. 1. The specific grouping of functionalities and order of steps are a mere example as many other variations of method 400 are possible, within the spirit of the present disclosure. Other variations are possible for different implementations.

At step 410, e-mails are received for trusted users of an enterprise network. At step 420, new phishing e-mail campaigns are individualized with machine learning for each user. At step 430, individualized training videos are generated for each user based on user responses to the new phishing e-mail campaign.

Figure 5:
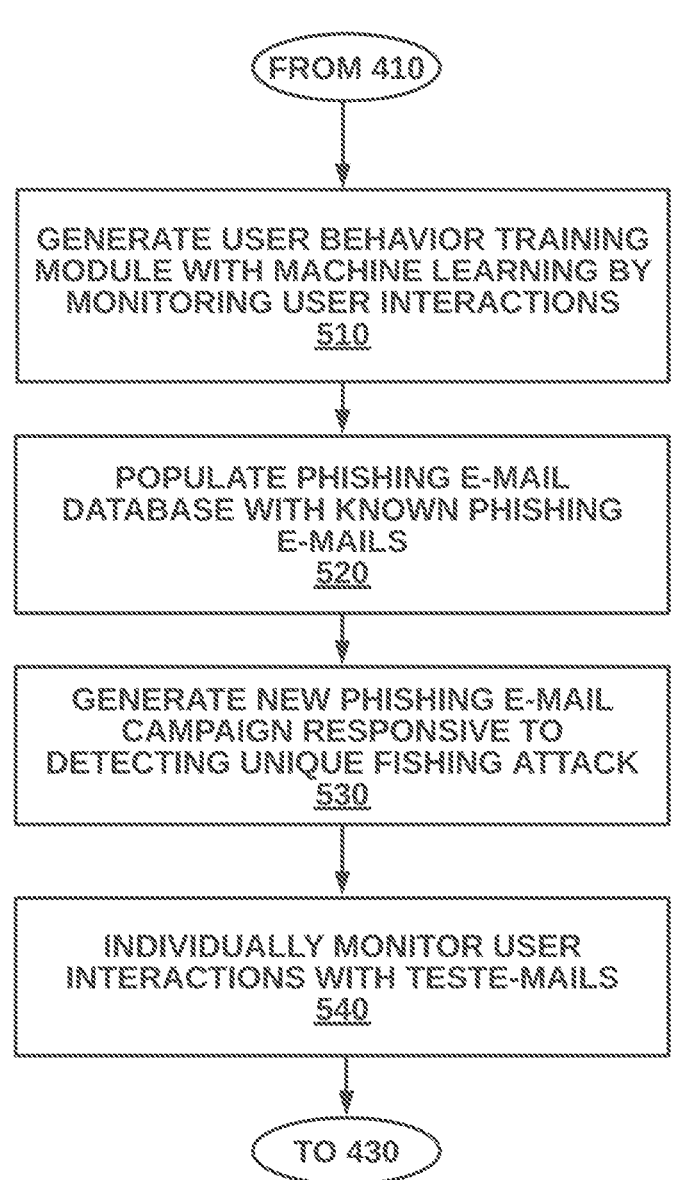
FIG. 5 is a flow diagram illustrating a step of generating custom phishing campaigns for users, from the method of FIG. 5, according to an embodiment.

More specifically, FIG. 5 shows details of step 420, according to an embodiment. At step 510, a machine learning module generates a user behavior training model, using machine learning, from tracking a plurality of trusted users for interactions with respect to a plurality of monitored phishing e-mails. The monitored phishing e-mails are not harmful.

At step 520, a phishing e-mail database is populated with incoming e-mails received from an email server that include a phishing attack. At step 530, if a unique phishing attack is detected, a new test phishing e-mail campaign is generated. Each user can potentially have a unique version based on an individual user behavior model. As a result, a first test phishing e-mail for a first user is modified based on interactions tracked for the first user and a second test phishing e-mail for a second user is modified based on interactions tracked for the second user. One or more users can also have identical test e-mails if user behavior is similar. At step 540, interactions with test e-mails are individually monitored for users.

Returning to FIG. 4, at step 430, based on responses to the plurality of test phishing emails, a plurality of custom training videos are generated. A first training video is modified based on a response from the first user and a second training video is modified based on a response from the second user. A video can be stitched together from a library of video clips.

III. Computing Device for Custom Phishing Attack Training (FIG. 6)

FIG. 6 is a block diagram illustrating a computing device 600 for use in the system 100 of FIG. 1, according to one embodiment. The computing device 600 is a non-limiting example device for implementing each of the components of the system 100, including phishing testing server 110, e-mail server 120, and user devices 130A-C. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general-purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, Javascript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase network appliance generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL and FORTIPHISH families of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a phishing training server for training trusted users of an enterprise network for phishing attacks on a per-user basis, the method comprising:
   generating a user behavior training model, using machine learning, from tracking the trusted users for interactions with respect to a plurality of monitored phishing emails, wherein the monitored phishing emails are not harmful;
   populating a phishing email database from training data of incoming emails received from an email server that include known phishing attacks;
   determining whether a phishing attack from an incoming email is unique from the training data;
   generating a plurality of test phishing emails for users for unique phishing attacks, from the unique phishing attack email that is modified by the user behavior model, wherein a first test phishing email for a first user is modified based on interactions tracked for the first user and a second test phishing email for a second user is modified based on interactions tracked for the second user; and
   based on responses to the plurality of test phishing emails, generating a plurality of training videos, wherein a first training video is modified based on a response from the first user and a second training video is modified based on a response from the second user.

2. The method of claim 1, wherein the interactions tracked for the monitored phishing emails for the plurality of trusted users include text content of responses, whether an attachment is downloaded, whether an attachment is viewed, whether a downloaded file is executed, and whether a Uniform Resource Locator (URL) is clicked.

3. The method of claim 1, wherein the interactions tracked for the monitored phishing emails for the plurality of trusted users include type of user device, email application executing on user device, location of user device, and Internet Protocol (IP) address of user device.

4. The method of claim 1, wherein the known phishing attacks are identified by one or more of text classification, keyword analysis, sentimental analysis, similarity analysis, and link and Uniform Resource Locator (URL) analysis.

5. The method of claim 1, wherein the phishing attack is determined to be unique responsive to being a new category or new source of phishing attack.

6. The method of claim 1, wherein the phishing attack is determined to be unique responsive to being a variation of an existing category or existing source of phishing attack.

7. The method of claim 1, further comprising: tracking interactions for the test phishing emails, wherein the interactions tracked for the test phishing emails to the plurality of trusted users include text content of responses, whether an attachment is downloaded, whether an attachment is viewed, whether a downloaded file is executed, and whether a Uniform Resource Locator (URL) is clicked.

8. A non-transitory computer-readable medium in a phishing training server training trusted users of an enterprise network, storing code that when executed, performs a method for phishing attacks on a per-user basis, the method comprising:

generating a user behavior training model, using machine learning, from tracking the trusted users for interactions with respect to a plurality of monitored phishing emails, wherein the monitored phishing emails are not harmful;

populating a phishing email database from training data of incoming emails received from an email server that include known phishing attacks; and determining whether a phishing attack from an incoming email is unique from the training data;

generating a plurality of test phishing emails for users for unique phishing attacks, from the unique phishing attack email that is modified by the user behavior model, wherein a first test phishing email for a first user is modified based on interactions tracked for the first user and a second test phishing email I for a second user is modified based on interactions tracked for the second user; and based on responses to the plurality of test phishing emails, generating a plurality of training videos, wherein a first training video is modified based on a response from the first user and a second training video is modified based on a response from the second user.

9. A phishing training server, for training trusted users of an enterprise network for phishing attacks on a per-user basis, the phishing training server comprising:

a processor;

a network interface communicatively coupled to the processor and to a data communication network; and a memory, communicatively coupled to the processor and storing:

a user behavior machine learning module to generate a user behavior training model, using machine learning, from tracking the trusted users for interactions with respect to a plurality of monitored phishing emails, wherein the monitored phishing emails are not harmful;

a phishing email database populated with incoming emails received from an email server that include known phishing attacks; and a phishing test generator to determine whether a phishing attack from an incoming email is unique from the training data, wherein the phishing test generator generates a plurality of test phishing emails for users for unique phishing attacks, from the unique phishing attack email that is modified by the user behavior model, wherein a first test phishing email for a first user is modified based on interactions tracked for the first user and a second test phishing email for a second user is modified based on interactions tracked for the second user; and a training video module to, based on responses to the plurality of test phishing emails, generate a plurality of training videos, wherein a first training video is modified based on a response from the first user and a second training video is modified based on a response from the second user.

\* \* \* \* \*